Sept. 18, 1928.
E. C. NEWCOMB
BRAKE
Filed Sept. 15, 1927
1,684,501
2 Sheets-Sheet 1
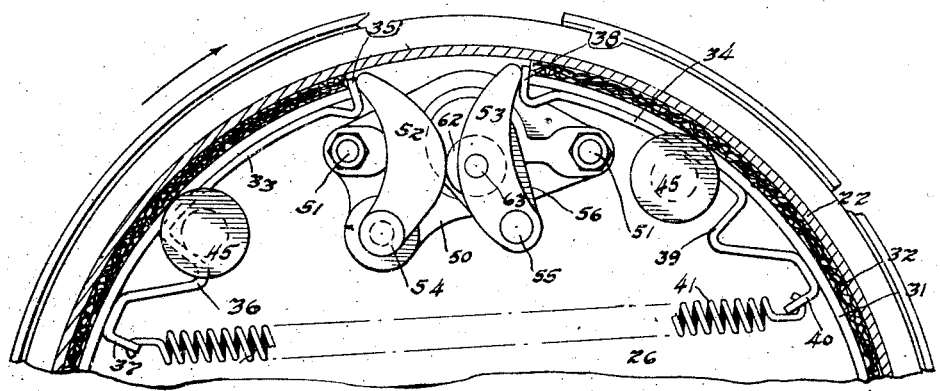
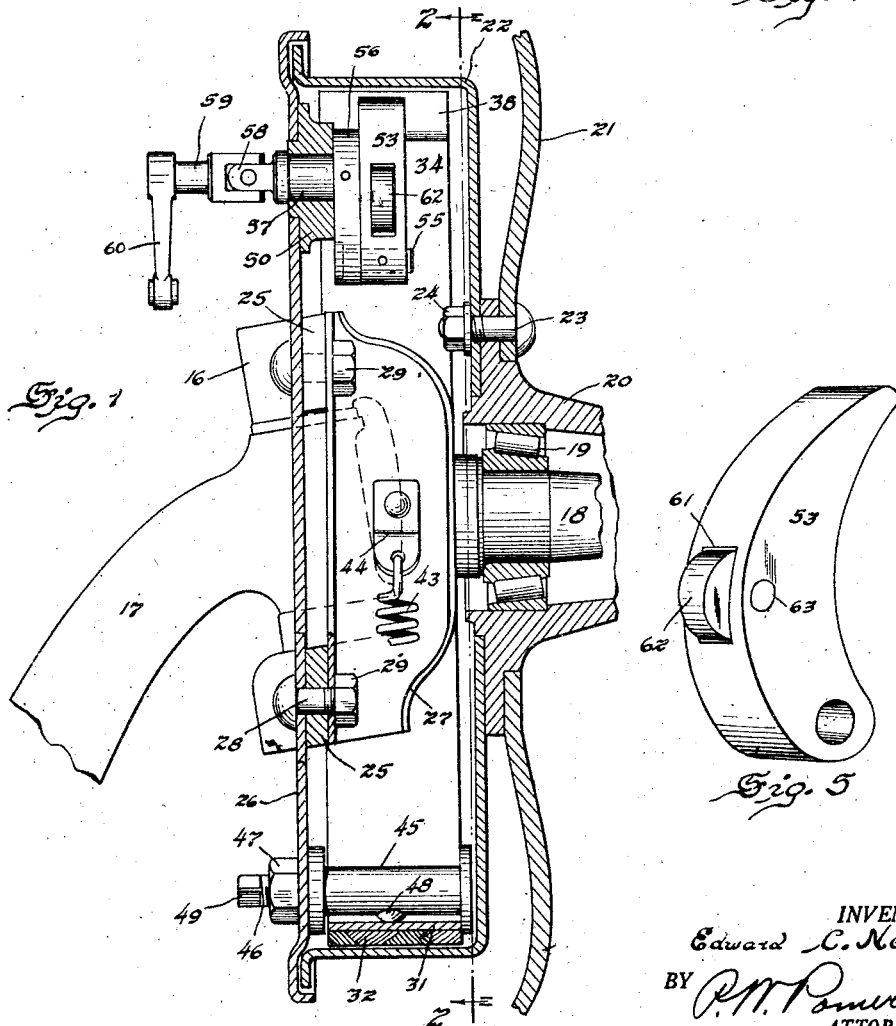
INVENTOR.
Edward C. Newcomb
BY
ATTORNEYS.

Sept. 18, 1928.

E. C. NEWCOMB 1,684,501

BRAKE

Filed Sept. 15, 1927

INVENTOR.
Edward C. Newcomb
BY
ATTORNEYS

Patented Sept. 18, 1928.

1,684,501

UNITED STATES PATENT OFFICE.

EDWARD C. NEWCOMB, OF SOUTH BEND, INDIANA, ASSIGNOR TO THE STUDEBAKER CORPORATION OF SOUTH BEND, INDIANA, A CORPORATION OF NEW JERSEY.

BRAKE.

Application filed September 15, 1927. Serial No. 219,761.

This invention relates to vehicle brakes and particularly to the operating mechanism therefor, the principal object being to provide a vehicle brake with a brake applying means comprising a pair of pivoted levers engageable with each other by means of a roller rotatably mounted on one of the levers and having line contact with the other of the levers so that movement of the lever provided with the roller will cause one or both levers to move the brake element into engagement with the brake drum.

Another object is to provide a vehicle brake with a brake applying means comprising a pair of levers, one of which is mounted on a fixed pivot and the other on a movable pivot, the levers being engageable with the ends of the brake element substantially in the circular path thereof, and being engageable with each other by means of a roller pivoted to one of the levers and having line contact with the other lever so that when the lever mounted on the movable pivot is moved, the roller will cause the other lever to move in the opposite direction to expand the brake element into frictional engagement with the brake drum.

A further object is to provide a vehicle brake of the internal type with a free-floating band, a pair of pivoted levers for expanding the same to engage the brake drum, and a roller pivoted to one of the levers and engageable with a face of the other lever so that movement of one lever will cause both levers to move in opposite directions to expand the brake element into frictional engagement with the rotating brake drum.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a section through the right front wheel of a motor vehicle taken approximately on the line 1—1 of Figure 2.

Figure 4 is a partial section similar to Figure 2, showing the brake mechanism in operative position when the brake drum is rotated in a clockwise direction.

Figure 5 is an enlarged perspective view of the brake operating lever having the roller mounted thereon.

Figure 2:
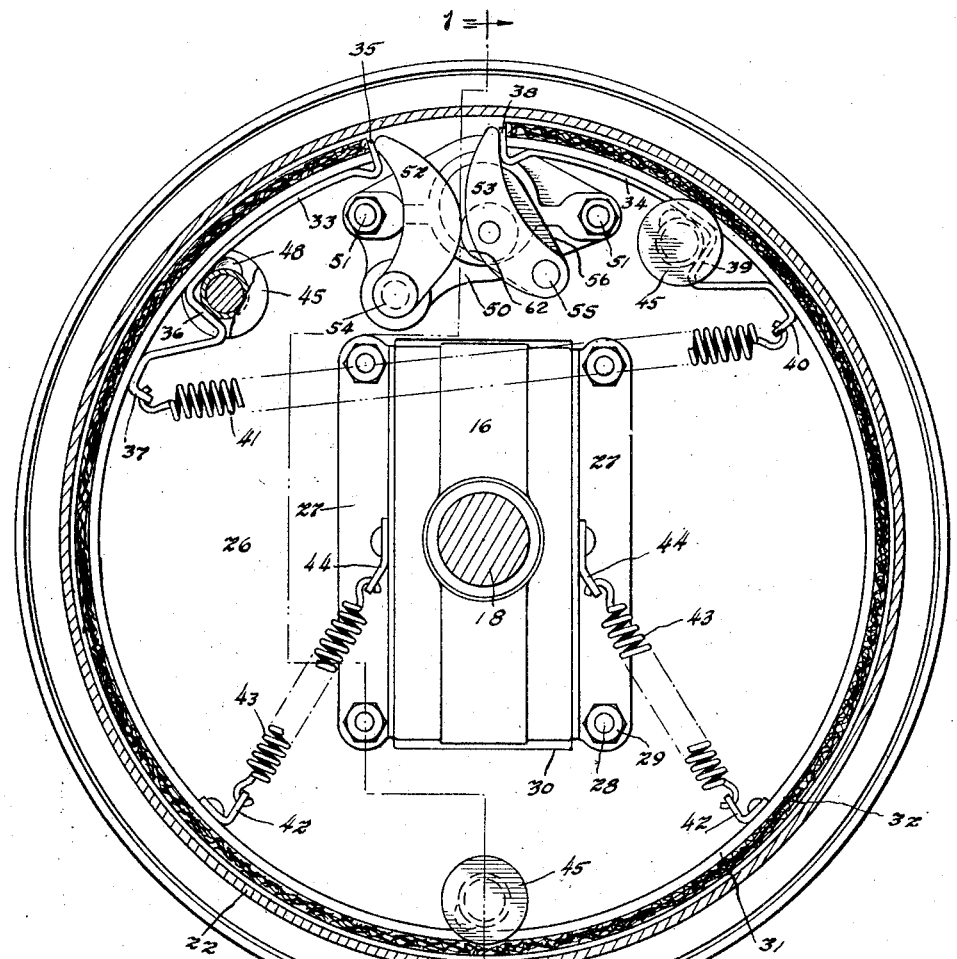
Figure 2 is a section taken on the line 2—2 of Figure 1, showing the brake mechanism in normal inoperative position.

Referring to the accompanying drawings in which like numerals refer to like parts throughout the several views, a steering knuckle 16 is pivoted to a conventional front axle 17 and has an outwardly extending stub axle 18 formed thereon. The stub axle 18 carries bearings 19 which rotatably support a wheel hub 20 to which a vehicle wheel 21 and a brake drum 22 are concentrically secured by bolts 23 provided with nuts 24. The steering knuckle 16 is formed with oppositely extending flanges 25 and to these are secured a dust cover 26 and two dust shields 27 by bolts 28 on which nuts 29 are threaded. The dust shields 27 are angle-shaped and fit closely against the sides of the steering knuckle 16 to cover the space between the knuckle and the axle to prevent dirt and dust from entering the brake drum 22. The dust cover 26 is formed with a rectangular opening 30 to allow a portion of the knuckle 16 to project therethrough, and is positioned concentrically with and as close to the edge of the upper end of the brake drum 22 as possible to exclude dirt particles.

A slit expandable band 31, preferably made of spring steel and faced with suitable friction material 32, is concentrically arranged within the drum 22. Stamped metal brackets 33 and 34 are secured to the ends of the brake band 31, the bracket 33 being formed with an end portion 35 which is bent perpendicularly to abut against the transverse end of the band 31 to provide a lever engaging face, with a central portion perpendicular to the band 31 to form a stop portion 36 which will be described later, and with a perpendicular inwardly extending portion 37 at the opposite end. The bracket 34 is formed with a lever engaging portion 38, a stop portion 39 and an end portion 40 similar to the portions 35, 36 and 37 of the bracket 33. A coil spring 41 extends between the ends 37 and 40 of the brackets 33 and 34 to normally draw the ends of the brake band 31 toward each other out of contact with the drum 22. Secured to the band 31 approximately 60° each side of the vertical center line are L-shaped brackets 42 to which coil springs 43 are hooked, the other ends of the springs being hooked through stampings 44 secured to the sides of the dust shields 27. The coil springs 43 also normally hold the band 31 in its retracted position out of engagement with the brake drum 22.

Diametrically opposite the operating mechanism and at each side thereof, are adjusting and stop members, each of which comprises a spool 45 provided with a threaded portion 46 projecting through the dust cover 26 and having a nut 47 threaded thereon to hold the same in adjusted position. The sides of the spool 45 act as a guide for the band 31 to prevent transverse movement of the same. A projection or button 48 is formed on the cylindrical surface of each spool to engage the band 31 and which, when the spool 45 is rotated by its squared end 49 adjusts the clearance between the band face 32 and the brake drum 22. The spools 45 positioned at each side of the operating mechanism also provide stop members for the band 31 and are so positioned that the stop portions 36 and 39 of the brackets 33 and 34 are normally engageable therewith, as shown in Figure 2, when the brake is in inoperative position.

Figure 3:
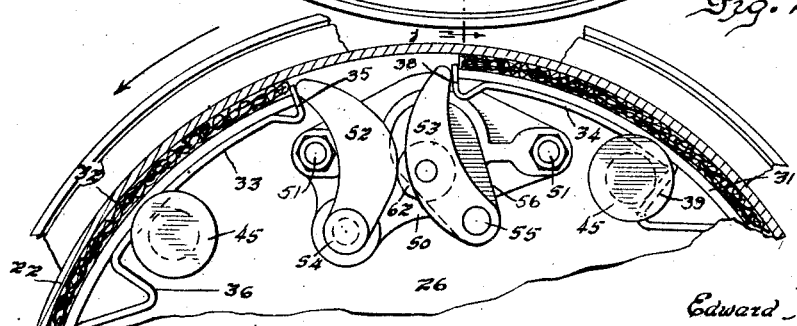
Figure 3 is a partial section similar to Figure 2, showing the brake mechanism in operative position when the brake drum is rotating in a counter-clock-wise direction.

The brake operating mechanism is carried by a support 50 secured to the dust cover 26 by bolts 51 and comprises two cam-shaped levers 52 and 53, the extreme ends of which contact with the faces of the end portions 35 and 38 of the brackets 33 and 34 on lines which lie substantially in the circular path of the band 31, as shown in Figures 3 and 4. The lever 52 is pivoted on a pin 54 secured to the support 50 and the lever 53 is secured to a pin 55 which is rotatably carried by a bell crank 56. The bell crank 56 is moved by a shaft 57 which is journaled in and extends through the support 50 and terminates in a U-shaped end to form one portion of a conventional universal joint 58 to which is secured an operating shaft 59. The shaft 59 is rotated by means of a rocker arm 60 connected by a conventional brake rod to a brake foot pedal or hand lever.

The lever 52 is actuated by the movement of the lever 53 which is recessed at 61 to receive a roller 62 rotatably mounted on a pin 63 which extends through the side walls of the recess 61. The roller 62 has line contact with and is free to roll on a face of the lever 52 whenever the lever 53 is moved by the bell crank 56. The lever 52 may be operated by the lever 53 by allowing the cam faces of each to contact with each other, but this is objectionable because considerable friction is set up between the faces and because this friction causes uneven operation of the levers. The roller 62 mounted in the lever 53 which contacts with the lever 52 provides easy unrestrained movement of both levers as the friction therebetween is eliminated.

In Figure 2 the several parts of the brake mechanism are shown in inoperative position with the brake band 31 drawn out of engagement with the brake drum 22 by the coil springs 41 and 43. In Figure 4, the vehicle having the brakes just described incorporated thereon is moving forwardly, that is, the brake drum 22 is rotating in a clock-wise direction and the brake operating parts have moved from the position shown in Figure 2 to the position shown in Figure 4. Movement of the rocker arm causes the shaft 57 to rotate the bell crank 56 in a clock-wise direction. As the ends of the levers 52 and 53 are in contact with the ends of the brake band 31 which are normally held against the expansion by the spring 41, the roller 62 acts as rolling fulcrum, which being between the ends of the levers 53 and contacting with the lever 52 between the ends thereof, causes the levers to move in opposite directions. The band 31 is thereby moved into initial engagement with the rotating brake drum 22. At the instant of initial engagement with the drum 22, the band 31 rotates therewith until the stop portion 36 of the bracket 33 engages the cylindrical portion of the adjacent spool 45 to prevent further rotation of the same. Further movement of the bell crank 56 rotates the lever 53, the roller 63 rolling along the cam surface of the lever 52 which is held against movement by the end 35 of the bracket 33 because of the resistance of that end of the band 31 to movement in a counter-clock-wise direction. The lever 53 contacts with the end 38 of the bracket 34 on a line which lies substantially in the circular path of the band 31 so that pressure supplied by the end of the lever 53 causes the band 31 to expand in a true circumferential direction. The maximum efficiency of the band 31 is therefore realized by expansion in this manner.

When the drum 22 is rotating in a counter-clockwise direction, the operating parts assume the position shown in Figure 3. The parts are moved in a manner similar to that just described except that the stop portion 39 of the bracket 34 engages its adjacent stop spool 45 and the opposite end of the band 31 is moved to engage the drum 22. When the braking pressure is released the tension in the springs 41 and 43 draws the band 31 back to normal inoperative position as shown in Figure 2.

Many advantages of the brake operating mechanism are apparent. It can be seen that the brake is equally as efficient when the vehicle is moving rearwardly as when it is moving forwardly. This is a decided advantage as most vehicles have brakes which operate most efficiently when moving in a forward direction. It can be seen that it is advantageous to apply pressure to the ends of the band along a line which lies substantially in the circular band thereof so that the maximum efficiency of an internal wrapping brake is obtained by expanding the band in a true circumferential direction. It can also be seen that the mechanism is simple in construction, that it is easy to assemble, and that it can be economically manufactured.

Formal changes may be made in the specific embodiment of the invention described without departing from the spirit and substance of the broad invention, the scope of which is commensurate with the appended claims.

What I claim is:

1. A brake mechanism comprising a rotatable drum, a braking element movable to engage said drum, and actuating means for said braking element comprising a pair of levers engageable therewith, a rotatable member mounted on one of said levers engaging a face of the other of said levers, and means for operating one of said levers.

2. In a vehicle brake having a rotatable drum and braking means engageable with said drum, means for engaging said braking means with said drum comprising a pair of arms engageable with said braking means, a rotatable member mounted on one of said arms engaging the other of said arms and having line contact therewith, and actuating means for said arms.

3. In a brake mechanism having a rotatable drum and a braking element movable to engage said drum, actuating means for said braking element comprising a pair of pivoted levers engageable with the ends of said braking element substantially in the circular path thereof, means for operating one of said levers, and a rotatable means mounted on one of said levers to contact with a face of the other of said levers, whereby movement of one of said levers causes one or both of said levers to engage said braking element with said brake drum.

4. In a brake mechanism having a rotatable drum and a braking element movable to engage said drum, actuating means for said braking element comprising a pair of pivoted levers engageable therewith, means for actuating one of said levers for engaging said braking element with said brake drum, and a rotatable roller mounted on one of said levers having line contact with the other of said levers to movably engage the same, said roller moving along the face of its contacting lever during the movement of the actuated lever.

5. In a brake mechanism having a rotatable drum and a braking element movable to engage said drum, actuating means for said braking element comprising a pair of levers engageable therewith, one of said levers being mounted on a fixed pivot and the other of said levers being mounted on a movable pivot, and a roller rotatably mounted on one of said levers having line contact with the other of said levers to movably engage the same whereby one or both of said levers may be moved to engage said braking element with said brake drum.

6. In a braking mechanism having a rotatable drum and a braking element movable to engage said drum, actuating means for said braking element comprising a lever mounted on a fixed pivot to engage an end of said braking element, a rotatable bell-crank, a second lever pivoted to said bell-crank and engaging the other end of said braking element, and a roller rotatably mounted on one of said levers having line contact with the other of said levers to movably engage the same, whereby one or both of said levers may move said braking element to engage said brake drum upon rotation of said bell-crank.

7. In a braking mechanism of the internal type having a rotatable drum and a brake band expandable to engage said drum, actuating means for said brake band comprising a support, a lever pivoted on said support and engaging an end of said brake band approximately in the circular path thereof, a bell-crank rotatably supported by said support, a second lever rotatably mounted on said bell-crank and engaging the other end of said brake band approximately in the circular path thereof, means mounted on one of said levers having line contact with the other of said levers, and means for rotating said bell-crank to move one or both of said levers for engaging said brake band with said brake drums.

8. In a braking mechanism of the internal type having a rotatable brake drum and a free floating brake band expandable to engage said drum, actuating means for said brake band comprising a support, a lever pivoted to said support and engaging an end of said band approximately in the circular path thereof, a bell-crank rotatably mounted on said support, a second lever pivoted to said bell-crank and engaging the other end of said band approximately in the circular path thereof, a roller rotatably mounted on said second lever having line contact with a face of said first-mentioned lever, rotation of said bell-crank moving one or both of said levers to expand said band in a circumferential direction to engage said drum, said roller rolling along the face of said first-mentioned lever during movement of said second lever.

Signed by me at South Bend, Indiana this 12th day of September, 1927.

EDWARD C. NEWCOMB.